（12）United States Patent
Ayyasamy

(10) Patent No.: US 12,122,227 B2
(45) Date of Patent: *Oct. 22, 2024

(54) SINGLE SHOT INJECTION MOLDED ARTICLE

(71) Applicant: GDC, Inc., Goshen, IN (US)

(72) Inventor: Suresh Ayyasamy, Goshen, IN (US)

(73) Assignee: GDC, Inc., Goshen, IN (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/739,302

(22) Filed: May 9, 2022

(65) Prior Publication Data

US 2022/0258595 A1 Aug. 18, 2022

Related U.S. Application Data

(63) Continuation of application No. 16/578,598, filed on Sep. 23, 2019, now Pat. No. 11,325,460, which is a
(Continued)

(51) Int. Cl.
*B60K 11/08* (2006.01)
*B29C 45/00* (2006.01)
*B29C 45/26* (2006.01)
*B60K 11/04* (2006.01)
*B60K 11/06* (2006.01)
(Continued)

(52) U.S. Cl.
CPC ............. *B60K 11/08* (2013.01); *B29C 45/00* (2013.01); *B29C 45/26* (2013.01); *B60K 11/04* (2013.01); *B60K 11/06* (2013.01); *B29C 2045/2695* (2013.01); *B29K 2021/003* (2013.01); *B29K 2823/10* (2013.01); *B29L 2031/30* (2013.01);
(Continued)

(58) Field of Classification Search
CPC ......... B60K 11/08; B60K 11/04; B60K 11/06; B29C 45/00; B29C 45/26; B29C 2045/2695
USPC ........................................................ 180/68.1
See application file for complete search history.

(56) References Cited

U.S. PATENT DOCUMENTS 2,197,502 A 4/1940 Lyon
3,937,192 A 2/1976 Longhouse
(Continued)

FOREIGN PATENT DOCUMENTS

CN 203869573 U 10/2014
DE 102008039806 A1 2/2010
EP 2481620 A2 8/2012

OTHER PUBLICATIONS

GDC, Inc., Sample Products, 2016—GDC Corporation, http://gdc-corp.com/products/second.php?S application=Air%20Flow%20Management, Accessed Nov. 15, 2016 (1 page).
(Continued)

*Primary Examiner* — Hau V Phan
(74) *Attorney, Agent, or Firm* — Dickinson Wright PLLC

(57) ABSTRACT

Disclosed herein is a baffle for regulating airflow around an object. The baffle can be of unitary construction and can be made by a single shot injection molding process. The baffle can have an edge portion that is more flexible than the base portion. The baffle has also can have a base portion with a base portion thickness and an edge portion with an edge portion thickness that is less than the base portion thickness. A method of making a baffle by an injection molding process is also disclosed.

20 Claims, 4 Drawing Sheets

Related U.S. Application Data continuation of application No. 15/474,540, filed on Mar. 30, 2017, now Pat. No. 10,457,136.

(51) Int. Cl.
  *B29K 21/00* (2006.01)
  *B29L 31/30* (2006.01)
  *F01P 11/10* (2006.01)

(52) U.S. Cl.
  CPC ....... *B29L 2031/3032* (2013.01); *F01P 11/10* (2013.01)

(56) References Cited

U.S. PATENT DOCUMENTS

| | | | |
|---|---|---|---|
| 4,357,914 A | 11/1982 | Hauser | |
| 4,397,348 A | 8/1983 | Klem | |
| 4,887,861 A | 12/1989 | Moch et al. | |
| 5,489,186 A | 2/1996 | Yapp et al. | |
| 5,520,513 A | 5/1996 | Kuroki et al. | |
| 5,915,490 A | 6/1999 | Würfel | |
| 6,027,307 A | 2/2000 | Cho et al. | |
| 7,814,963 B2 | 10/2010 | Adamson et al. | |
| 8,056,613 B2 | 11/2011 | Frijas | |
| 8,221,074 B2 | 7/2012 | Nelson | |
| 8,312,949 B2 | 11/2012 | Hirukawa et al. | |
| 8,434,579 B2 | 5/2013 | Widmer et al. | |
| 8,454,718 B2 | 6/2013 | Buchmann et al. | |
| 8,919,864 B2 | 12/2014 | Kojima et al. | |
| 8,925,510 B2 | 1/2015 | Stec et al. | |
| 9,162,641 B2* | 10/2015 | Townson | B62D 27/06 |
| 9,303,530 B2 | 4/2016 | Albert et al. | |
| 10,457,136 B2* | 10/2019 | Ayyasamy | B29C 45/26 |
| 11,325,460 B2* | 5/2022 | Ayyasamy | B29C 45/00 |
| 2003/0234555 A1 | 12/2003 | Hojna | |
| 2009/0162195 A1* | 6/2009 | Nelson | F04D 29/646 |
| | | | 415/219.1 |
| 2010/0083917 A1 | 4/2010 | Saida et al. | |
| 2011/0132677 A1 | 6/2011 | Kawahira | |
| 2011/0297468 A1 | 12/2011 | Coel et al. | |
| 2012/0048633 A1 | 3/2012 | Williams et al. | |
| 2013/0175011 A1 | 7/2013 | Leonard | |
| 2014/0138513 A1 | 5/2014 | Lecroq et al. | |
| 2014/0291056 A1 | 10/2014 | Takanaga et al. | |
| 2016/0318387 A1 | 11/2016 | Kuhn et al. | |

OTHER PUBLICATIONS

Genuine GM 15208496 Radiator Air Baffle, Right: Automotive, Amazon.com, https://www.amazon.com/Genuine_-_15208496-Radiator-Baffle-_(4 pages).

Radiator Baffle Set (Left/Right/Bottom), Go Westy, http://www.gowesty.com/product-details.php?y-&id=23975, Accessed Nov. 15, 2016 (3 pages).

* cited by examiner

SINGLE SHOT INJECTION MOLDED ARTICLE

CROSS-REFERENCE TO RELATED APPLICATIONS

This application is a continuation of U.S. Non-Provisional patent application Ser. No. 16/578,598, filed Sep. 23, 2019, which is a continuation of U.S. Non-Provisional application Ser. No. 15/474,540, filed on Mar. 30, 2017, now U.S. Pat. No. 10,457,136, all of which are hereby incorporated by reference in their entirety.

BACKGROUND

The present disclosure relates to baffles and methods of making them. More particularly, the disclosure relates to a baffle, such as a radiator baffle, which is made by a single-shot injection molding process, and which has increased flexibility at its sealing edge and thereby avoids a crash condition when in use.

In many mechanical contexts, including the radiator of a vehicle, control of air circulation assists in proper operation of a component. Baffles can function to divert air flow such that it either is guided into, or is kept out of, a particular area. Additionally, in mechanical architectures where parts are spaced to fit together without colliding, but air flow management and gap filling are still required, baffles can be used to fill spaces and meet manufacturing tolerances.

Typically, baffles having flexible edges are produced by joining separate materials having different flexibilities. The two components are attached together in a two-shot process to form the baffle, in some instances by an attachment process such as sonic welding, attaching a relatively flexible material to one which is relatively stiffer. Such baffles, however, may not provide a good seal owing to their lower flexibility. Further, the process is labor-intensive owing to multiple steps, and has a relatively high cost due to the additional labor and expensive tooling.

It has been a challenge to develop an economical method of producing baffles that provide good sealing and flexibility.

BRIEF SUMMARY OF THE INVENTION

The present invention relates to a baffle for regulating air flow around an object. The baffle may be of unitary construction and can be made in a single shot injection molding process.

In one embodiment, the baffle includes a base portion and an edge portion for contacting surface of the object. The base portion and the edge portion may be of unitary construction. The base portion may have a base portion thickness, and the edge portion may have an edge portion thickness that is less than the base portion thickness. The edge portion may have a first edge portion thickness proximal to the base portion and may taper away from the base portion to a second edge portion thickness distal to the base portion that is less than the first edge portion thickness.

In another embodiment, the baffle may include a base portion and an edge portion connected to the base portion at a junction. The base portion and the edge portion may be of unitary construction. The base portion may have a first thickness at the junction, and the edge portion may have a second thickness less than the first thickness at the junction.

In another embodiment, the baffle comprises a base portion and an edge portion for contacting the surface of the object. The base portion and the edge portion may be of unitary construction. The edge portion may be more flexible than the base portion. For example, the base portion may have a first flexural modulus, and the edge portion may have a second flexural modulus, where the first flexural modulus is greater than the second flexural modulus.

In some embodiments, the edge portion of the baffle preferentially deforms in a defined direction when the edge portion is placed in contact with the surface of the object to impart directional flexibility.

In another embodiment, a method of making the baffle for regulating air flow around an object is disclosed. The method may include a single shot injection molding step comprising injecting a single material in a molten state into a mold and allowing the material to solidify to form a baffle comprising a base portion and an edge portion, the base portion having a base portion thickness, and the edge portion having an edge portion thickness that is less than the base portion thickness. The material may be a polymer, such as polypropylene.

Further aspects, features, and advantages of the invention will become apparent from consideration of the following description and the appended claims when taken in connection with the accompanying drawings.

DETAILED DESCRIPTION OF THE INVENTION

The following provides a detailed description of several embodiments of the present invention. The description is not intended to limit the invention in any manner, but rather serves to enable those skilled in the art to make and use the invention.

The present disclosure relates to a baffle for regulating air flow around an object, the baffle comprising a base portion and an edge portion for contacting a surface of the object, the base portion and the edge portion being of unitary construction, the base portion having a base portion thickness, and the edge portion having an edge portion thickness that is less than the base portion thickness such that the edge portion is capable of deforming to mate with the surface of the object while the base portion remains substantially rigid.

The present disclosure also relates to a baffle for regulating air flow around an object, the baffle comprising a base portion and an edge portion for contacting a surface of the object, the base portion and the edge portion being of unitary construction, wherein the edge portion is more flexible than the base portion such that the edge portion is capable of deforming to mate with the surface of the object while the base portion remains substantially rigid. In some embodiments, the base portion has a first flexural modulus, and the edge portion has a second flexural modulus that is less than the first flexural modulus. In some embodiments, the second flexural modulus is about 10% to about 95% of the first flexural modulus, or about 20% to about 75% of the first flexural modulus, or about 25% to about 50% of the first flexural modulus, or about 30% of the first flexural modulus.

As used herein, the phrase "unitary construction" refers to an object made up of a single, homogeneous body of material, without seams or joints.

A used herein, the phrase "edge portion thickness" refers to the thickness of the edge portion of the baffle. Where the edge portion of a baffle does not have a uniform thickness, the baffle will be understood to have multiple edge portion thicknesses. The edge portion thickness of a baffle will be understood to be less than the base portion thickness if the mean edge portion thickness is less than the base portion thickness. Likewise, where the edge portion thickness is expressed as a percentage of the base portion thickness, the percentage refers to the mean edge portion thickness.

As used herein, the phrase "base portion thickness" refers to the mean thickness of the base portion of the baffle.

Figure 1:
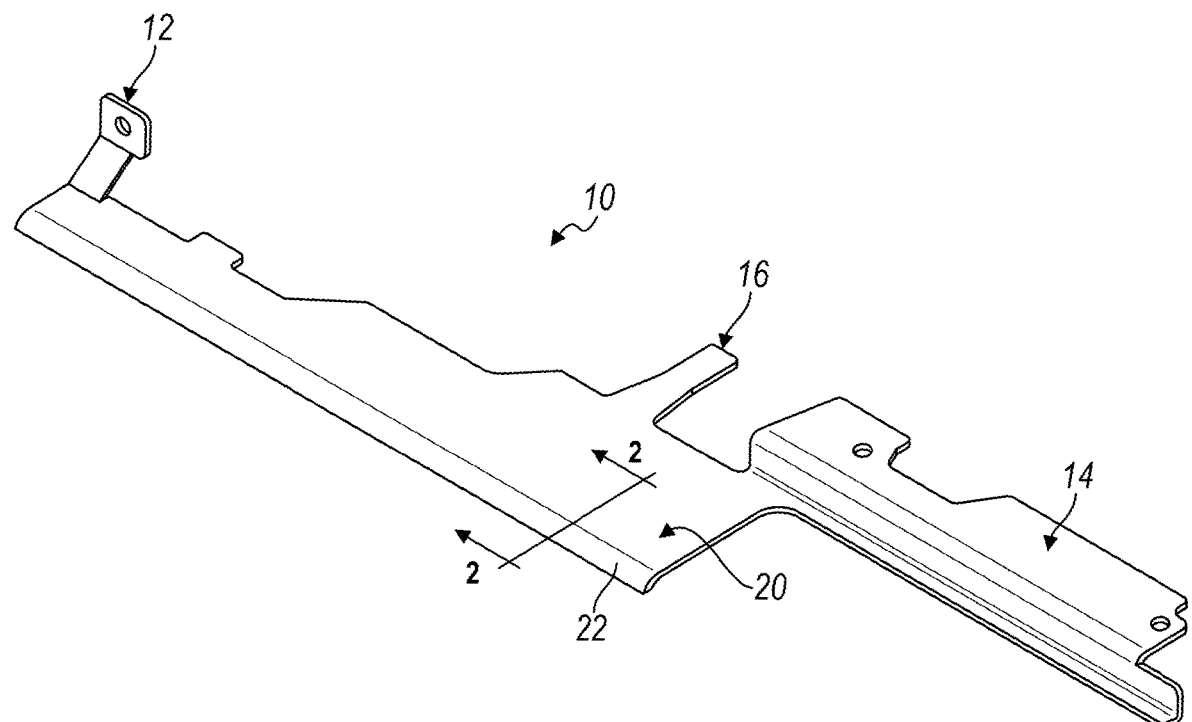
FIG. 1 is perspective view of a unitary baffle constructed in accordance with the principles of the present disclosure.

Referring to FIG. 1, a baffle 10 constructed according to the principles of the present invention is depicted. The baffle 10 may include a base portion 20 which is substantially planar and may constitute the largest portion of the baffle 10. The baffle may include a first connecting portion 12 and a second connecting portion 14 for securing the baffle 10 in the position in which it is to operate (for instance, to a side or a bottom of a radiator). The baffle may include at least one tab 16 for increased stability in placement of the baffle 10 by providing an additional point of contact between the baffle 10 and the assembly to which it is connected.

The baffle 10 also includes an edge portion 22, which may function to form a seal with another object. In the illustrated embodiment, the edge portion 22 extends away from the base portion 20 to form a sealing portion of the baffle 10. The edge portion is capable of deforming to mate with the surface of the object while the base portion remains substantially rigid.

Figure 2:
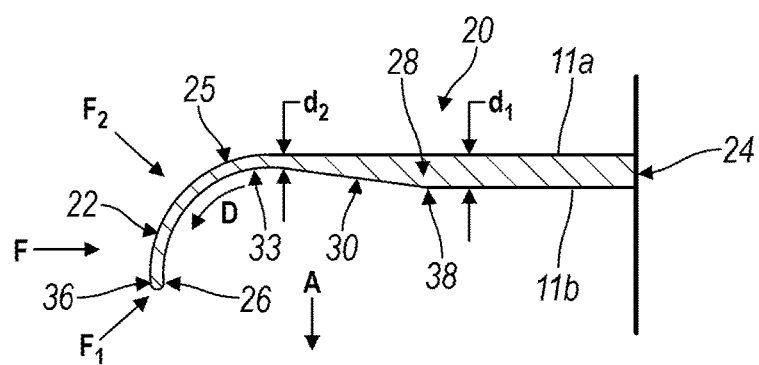
FIG. 2 is a cross-sectional view of the baffle of FIG. 1.

FIG. 2 shows a cross-sectional view along line 2-2 of the baffle 10 and further illustrates features of the embodiment shown in FIG. 1. The base portion 20 extends from a first end 24 to a junction 38. It will be understood that, where the baffle 10 is of unitary construction, the junction 38 simply refers to the location where the base portion 20 ends and the edge portion 22 begins. The base portion 20 has a base portion thickness d1. Although the base portion 20 is illustrated in this embodiment as having a substantially uniform thickness, it will be appreciated that the base portion 20 may be selected to have a non-uniform thickness according to the need served by such a component. The edge portion 22 of the baffle 10 extends from the junction 38 and to the second end 26. The baffle 10 depicted in FIG. 2 has first and second major surfaces 11a and 11b. The major surfaces are substantially continuous at the junction 38.

In some embodiments, the edge portion is tapered such that the edge portion thickness comprises a first edge portion thickness proximal to the base portion and a second edge portion thickness distal to the base portion that is less than the first edge portion thickness. In the embodiment illustrated in FIG. 2, the edge portion 22 includes a tapered portion 30, where the thickness of the edge portion 22 decreases between the junction 38 and a point 33 along its length. In some embodiments, the tapered portion 30 may continue all the way to the second end 26. In other embodiments, the tapered portion 30 may extend only part of the way along the length of the edge portion 22, such that there exists a portion of substantially uniform thickness toward the second end 26 of the edge portion 22.

The tapered portion 30 results in the edge portion 22 having a decreasing edge portion thickness as measured from the junction 38 and away from the base portion 20. At a particular point away from the base portion 20, the edge portion 22 may have an edge portion thickness d2 which is less than the base portion thickness d1. Overall, an edge portion 22 which includes a single tapered portion 30 may decrease in thickness from a first edge portion thickness to a second edge portion thickness at the second end 26, the second edge portion thickness being less than the first edge portion thickness.

In one embodiment, the tapered portion 30 may decrease in thickness at a substantially constant rate, such that the edge portion 22 tapers in a substantially linear fashion. Depending on the need fulfilled by the baffle 10, the edge portion thickness may be about 20% to about 75% of the measure of the base portion thickness, or about 25% to about 60% of the measure of the base portion thickness, or about 30% to about 50% of the measure of the base portion thickness. In one embodiment, the edge portion thickness may be about 30% of the measure of the base portion thickness. In another embodiment, the edge portion thickness may be about 50% of the measure of the base portion thickness. In an embodiment where the baffle 10 is a radiator baffle for an automobile, d2 (as measured at the second end 26 of the baffle 10) may be about 0.5 millimeters, and d1 (as measured in the base portion 20) may about 2 millimeters, where d2 represents the thinnest portion of the baffle 10. It will be appreciated that the values of d1 and d2 as disclosed herein are only exemplary, and baffles of different sizes and for different purposes may have a number of different thicknesses and still fall within the scope of the present disclosure.

It will be appreciated that in certain embodiments, the quantity d2 recited may not represent the thinnest portion of the edge portion 22.

In some embodiments, the edge portion of the baffle preferentially deforms in a defined direction when the edge portion is placed in contact with the surface of the object to impart directional flexibility. The thickness and shape of the edge portion may be selected to control the amount and direction of deformation. Generally, those portions of the edge portion that have the smallest edge portion thickness deform most readily. For example, where the edge portion is tapered, those portions of the edge portion furthest from the base portion (and having the smallest edge portion thickness) generally deform most readily.

In the embodiment shown in FIG. 2, the edge portion 22 include a curved portion 25 defining a curve. The curved portion 25 increases the flexibility of the edge portion 22, particularly in response to forces applied substantially parallel to the plane of the baffle, ensures a better fit in certain areas of an assembly, and allows for better sealing in a nominal condition for the baffle 10. In some instances where the edge portion 22 includes a curved portion 25, at least part of the surface 36 of the edge portion 22 occupies a plane that lies substantially perpendicular to a plane of the base portion 20. The radius of curvature of the curved portion 25 may be selected to result in a baffle 10 that best fits the assembly into which it is to be placed.

The flexibility of edge portion 22 depends on the direction of force applied to the edge portion. When a force F is exerted on the edge portion 22 in a direction substantially parallel to the plane of the baffle 10, the edge portion 22 preferentially bends in the direction of the curve with no or minimal twisting or inversion of the edge portion 22, such that it can still function to regulate airflow as intended. When a force F1 is applied in a direction opposite the curve, the flexibility of the edge portion 22 is less than when the force is applied in a direction substantially parallel to the plane of the baffle 10. When a force F2 is applied in the direction of the curve, the flexibility of the edge portion 22 is greater than when force is applied in a direction substantially parallel to the plane of the baffle 10.

The edge portion preferentially deforms in the direction of the curve. For example, in the embodiment shown in FIG. 2, the curved portion 25 defines a curve in direction A. When an object is placed in contact with the edge portion 22, and a force F is applied to the edge portion 22 in a direction substantially parallel to the base portion 20, the edge portion 22 preferentially deforms in the direction of the curve, as indicated by the arrow D. The extent of deformation, and the force applied by the edge portion 22 against the object, increases as the distance between the object and the junction 38 decreases.

Figure 3:
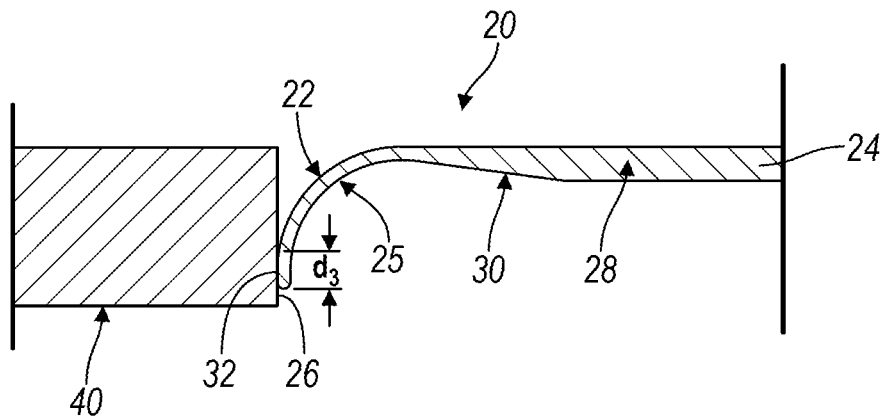
FIG. 3 is a side view of a baffle constructed in accordance with the principles of the present disclosure, shown in a nominal condition with a mating component.
Figure 4:
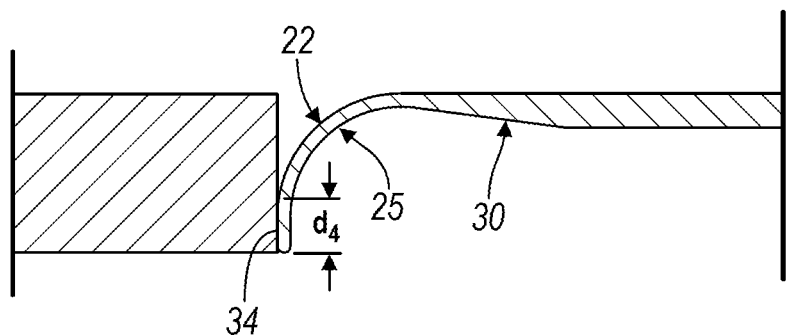
FIG. 4 is a side view of the baffle and mating component of FIG. 3, shown instead in a crash configuration.

A baffle 10 as illustrated in FIGS. 1 and 2 may yield better sealing owing to the thinning of the edge portion, which can lead to increased flexibility of the sealing edge. As illustrated in FIG. 3, the edge portion 22 contacts a mating component 40 from the second end 26 and up its length to form a nominal interface 32. The length of the nominal mating interface is signified by d3. If the components of the assembly move such that the baffle 10 is forced closer to the mating component 40, such motion may give rise to a compensation condition. In the compensation condition, a larger fraction of the edge portion 22 meets the mating component 40, such that a compensation interface 34 is derived, with an interface length of d4, greater than nominal interface length d3. The curved portion 25 of the sealing edge portion 22 leads to a condition in which the baffle 10 is still able to seal without causing a crash condition and disruption of the air regulation activity of the baffle 10.

A baffle 10 as constructed in accordance with the embodiment illustrated in FIGS. 1 and 2 may act to increase the unidirectionality of sealing against a mating component. The curved portion 25 has a bias such that even under conditions of increased duress, the baffle 10 will continue to seal against a mating element, due to the flexibility and shape of the edge portion 22. The tapered portion 30 can result in a decrease in the flexural modulus of the baffle 10 between the junction 38 and the second end 26. Such a construction improves initial deflection, and due to the taper and to the bias of the curve, the more the edge portion 22 is pushed, the more it bends in the direction it is pushed, as opposed to adopting a failure state in which the relatively thin edge portion inverts or twists, thereby leading to a condition in which air flow is regulated incorrectly.

Figure 5:
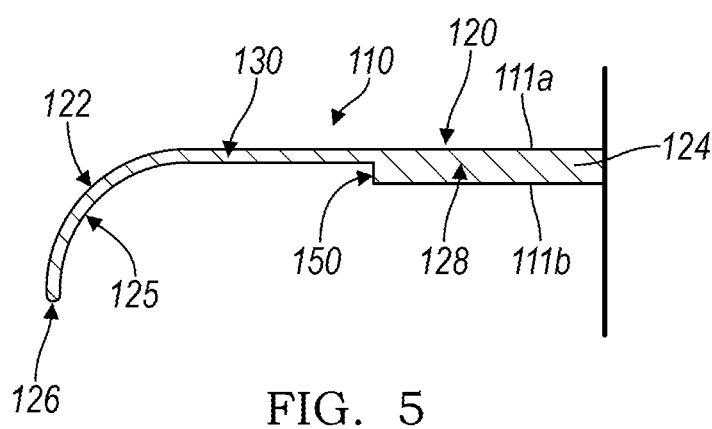
FIG. 5 is a cross-sectional view of another embodiment of a baffle illustrating a step down in thickness at the seal.
Figure 6:
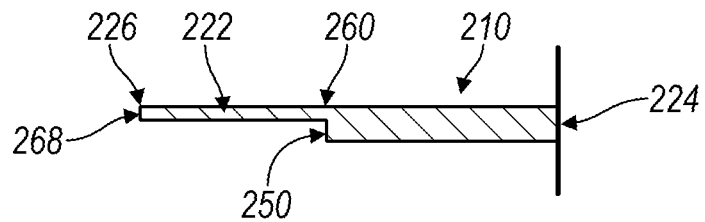
FIG. 6 is a cross-sectional view of another embodiment of a baffle illustrating a step down in thickness without a curved portion.
Figure 7:
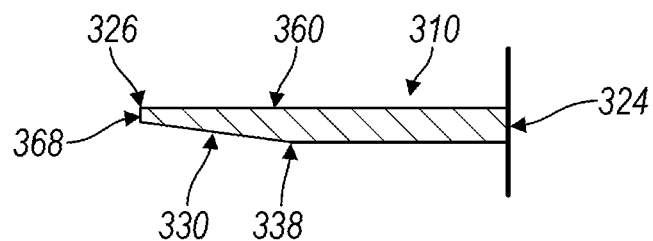
FIG. 7 is a cross-sectional view of another embodiment of a baffle illustrating a taper in thickness and without a curved portion.

FIGS. 5-7 illustrate alternative embodiments of baffles constructed in accordance with the principles of the present disclosure. In the embodiment illustrated in FIG. 5, a baffle 110 includes a base portion 120 from which an edge portion 122 steps down in thickness at step 150. Thus, in the embodiment illustrated in FIG. 5, the first major surface 111a is substantially continuous, but the second major surface 111b is not. The edge portion 120 may extend away from the step 150 to second end 126, and in doing so, may include a tapered portion 130 such that the thickest portion of the edge portion 122 is closest the step 150, and the thinnest portion is closest second end 126. In another embodiment, the edge portion 122 may have a substantially constant thickness along its entire length. The baffle 110 in this embodiment has a curved portion 125 in the edge portion 122 to act as a seal, and has a unitary construction. Like the embodiment shown in FIG. 2, the flexibility of edge portion 122 depends on the direction of force applied to the edge portion. When a force is exerted on the edge portion 122 in a direction substantially parallel to the plane of the baffle 110, the edge portion 122 preferentially bends in the direction of the curve with no or minimal twisting or inversion of the edge portion 122, such that it can still function to regulate air flow as intended. When a force is applied in a direction opposite the curve, the flexibility of the edge portion 122 is less than when the force is applied in a direction substantially parallel to the plane of the baffle 110. When a force is applied in the direction of the curve, the flexibility of the edge portion 122 is greater than when force is applied in a direction substantially parallel to the plane of the baffle 110.

The baffle 210 illustrated in FIG. 6 does not have a curve in its edge portion 222; rather, the base portion 220 and the edge portion 222 together combine to make a substantially continuous top surface 260 which extends from the first end 224 to the second end 226. The sealing edge 268 is substantially perpendicular to the top surface 260. In this embodiment, the edge portion 222 is thinner than the base portion 220 and the junction is a step 250. The edge portion 222 may or may not be tapered. The flexibility of edge portion 222 depends on the direction of force applied to the edge portion. When a force is exerted on the edge portion in a direction substantially parallel to the plane of the baffle 210, the flexibility of the edge portion 222 is less than when the force is applied at an angle to the plane of the baffle 210.

The baffle 310 of FIG. 7 is similar to the baffle 210 of FIG. 6, but in this case the junction is not a step; rather, the edge portion 322 tapers from junction 338 to second end 326. Such a design may be desirable in a number of air flow regulation or gap filling applications, including hood seals, side seals, beauty seals, and the like. Like the embodiment shown in FIG. 6, the flexibility of edge portion 322 depends on the direction of force applied to the edge portion. When a force is exerted on the edge portion in a direction substantially parallel to the plane of the baffle 310, the flexibility of the edge portion 322 is less than when the force is applied at an angle to the plane of the baffle 310.

In the designs above, the base portion 20/120/220/320 of respective baffle 10/110/210/310 is relatively rigid or inflexible, whereas the edge portion 22/122/222/322 is relatively flexible. In certain embodiments, the flexibility of the edge portion may be derived from its lower overall thickness, when compared to the base portion. Thus, the base portion 20/120/220/320 may have a first flexural modulus, and the edge portion 22/122/222/322 may have a second flexural modulus which is less than the first flexural modulus. A baffle with a tapering edge portion may have progressively decreasing flexural moduli along its length as traced away from the junction and toward the second end of the baffle. A baffle of such construction may be favorable for meeting tolerances, such as the 3-5 mm tolerances required by many automotive manufacturers for sealing applications.

Figure 8:
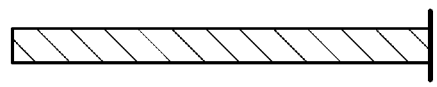
FIGS. 8-10 are graphical representations of the results of compression/deflection tests on a variety of baffles.
Figure 8:
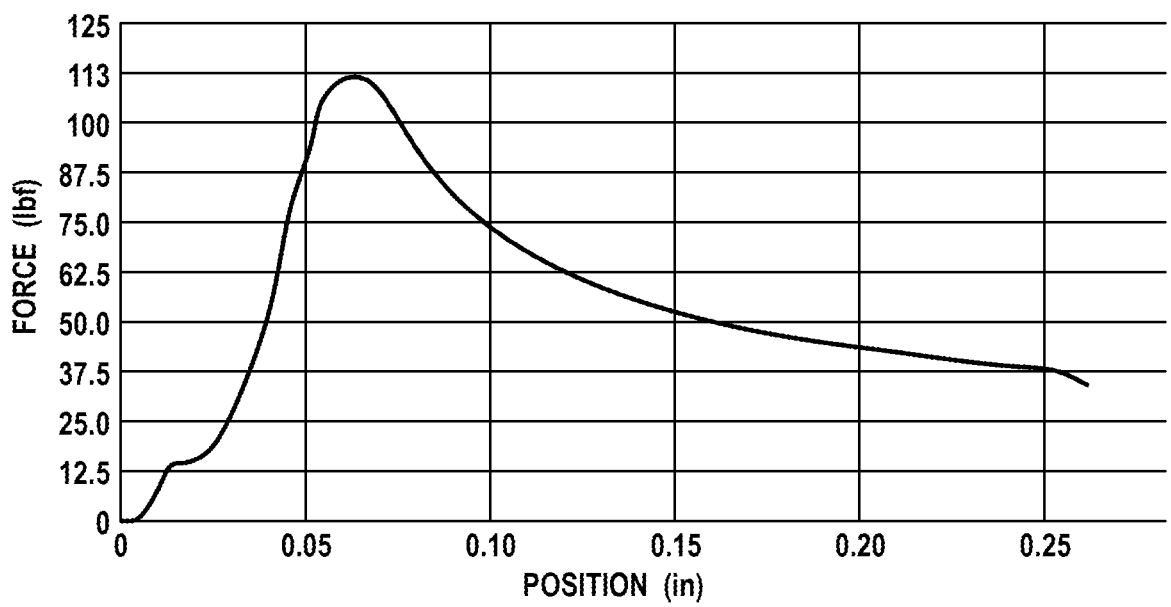
Figure 9:
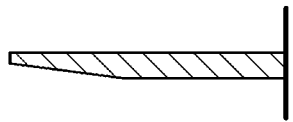
Figure 9:
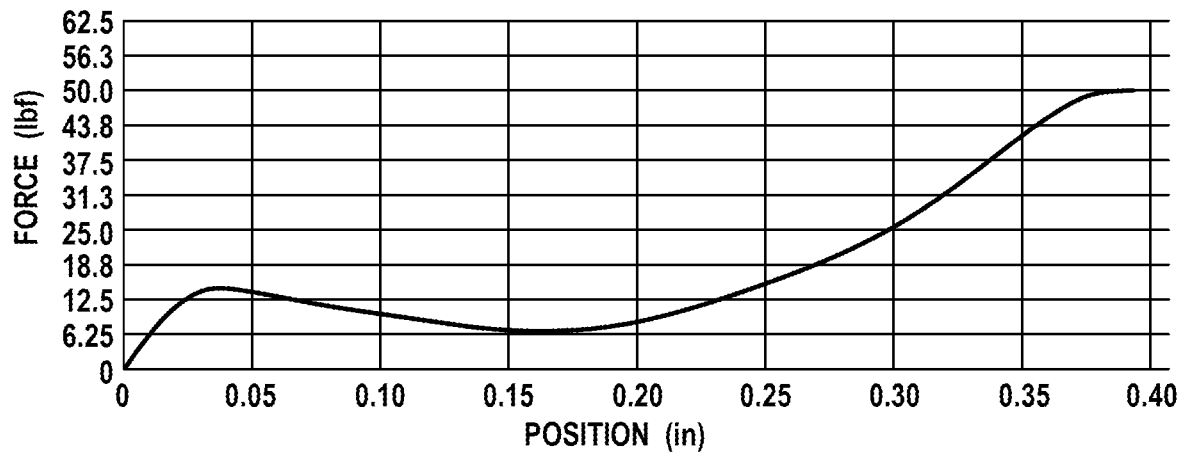
Figure 10:
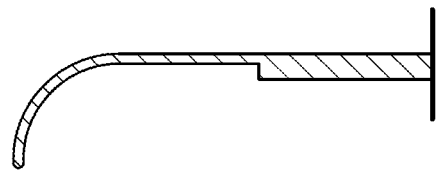
Figure 10:
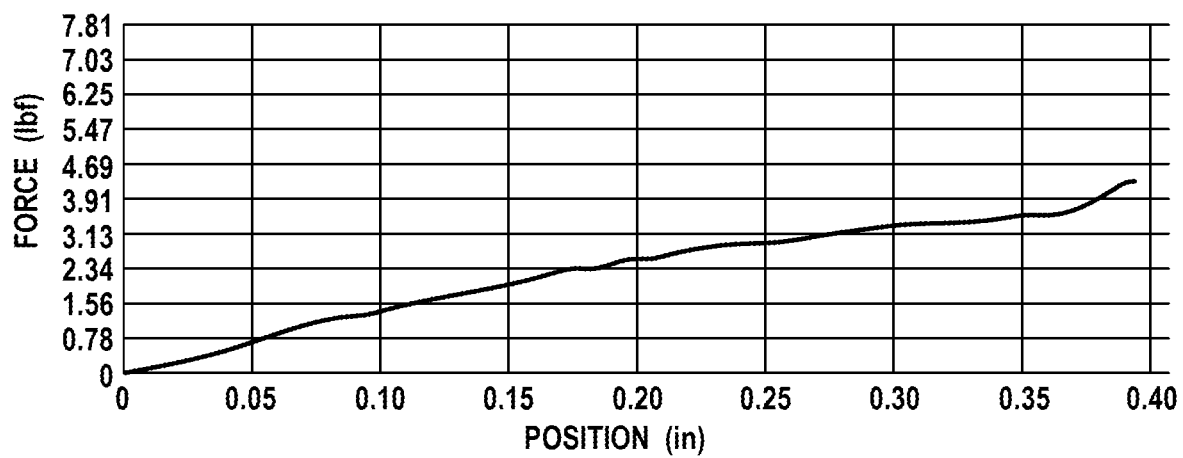

The physical properties of a baffle constructed in accordance with principles of the present invention are further illustrated by the results of straight-edge compression/deflection testing. In the tests illustrated in FIGS. 8-10, a force was applied to a two-inch long sample of a baffle, in a direction parallel to the plane of the baffle, to cause deflection of the material with a magnitude of up to about 10 millimeters. A deflection plate was placed in contact with the edge of the baffle, without causing deflection of the baffle, and was moved toward the baffle, in a direction parallel to the plane of the base portion of the baffle, to cause deflection of the baffle. The graphs in FIGS. 8-10 depict the force applied to the baffle as a function of the displacement of the plate from its original position In FIG. 8, a component having a uniform thickness and a straight edge is subjected to such a test, yielding a curved profile that bears out a maximum force associated with the deflection of 0.50 kilonewton (kN). As shown in FIG. 8, the force required for deflection increased to a maximum at about 0.06 inches of displacement of the plate and then decreased upon further displacement of the plate, indicating a failure of the material when 113 pound-feet of energy were applied to the edge.

By contrast, the sample tested in FIG. 9 is a tapered element similar to the baffle of FIG. 7. The taper reduces the maximum force applied to affect a deflection of about 0.22 kN, with about 50 pound-feet required upon a 0.4 inch displacement of the plate from its original position.

Finally, a curved taper (similar to the baffle structure of FIGS. 1-4) was subjected to the same test. The results, as shown in FIG. 10, demonstrate that far less force is required to affect deflection of the baffle with this shape, resulting in a maximum force applied of 0.02 kN during the trial, and about 4.5 pound-feet of energy upon a 0.40 inch displacement of the plate from its original position. The force increased as the displacement of the plate from its original position increased. Taken together, a tapered portion in the edge portion of a baffle can be seen to impart increased flexibility and pliability to the component, avoiding a failure condition, and further increases in flexibility and pliability were observed when the tapered portion comprised as a curved portion.

As will be appreciated by one of skill in the art, a baffle of such construction may be used for a number of different applications. A baffle may be used to regulate air incoming to a radiator, such as through a fascia opening of an automobile. The baffle may also be used as a side baffle. Other uses include shields around headlights, recirculation baffles, weather stripping, and beauty seals (under hood), among others. Depending on the size of the vehicle or other assembly, the scale of the baffle, including the length, width, and thickness of the base portion; length, width, and thickness of the edge portion; angle of taper; and other dimensions may be customized to fill gaps and meet tolerances for a variety of different assemblies.

Instead of being made of a relatively rigid component attached to a relatively soft component, the baffle 10 as depicted in FIG. 1 has a flexible edge portion 22 and a relatively rigid base portion 20 due to the change in thickness in the component, even if made of a single material, the change in thickness being provided such as by the taper 30 illustrated in FIG. 2. The edge portion 22 may be a sort of living hinge, and may represent a soft lip for forming a seal. The relative flexibility of edge portion 22 may further improve sealing by allowing the sealing edge to conform to the component against which it is to form the seal, thereby compensating for any structural imperfections in the mating surface.

The present disclosure also relates to a method of making a baffle for regulating air flow around an object, comprising injecting a single material in a molten state into a mold and allowing the material to solidify to form the baffle. This process is known as "single shot injection molding." The foregoing method may be used to make any of the baffles described herein.

Unlike conventional baffles that are currently on the market, the illustrated baffles 10/110/210/310 can be made by a one-step, single shot injection molding and have a unitary construction. As a result, the baffle 10/110/210/310 may be made of a single material. Further, the part may be constructed without an extrusion step, and may not involve time-consuming and costly post processing steps, such as bending or sonic welding.

An injection molded baffle 10/110/210/310 can be constructed from a number of different materials. Pliable polymers that can be used for injection molding workflows may be used for such a baffle. Among these polymers are polypropylene. In one embodiment, the baffle may be constructed of a polypropylene-based material, such as an ENDURAPRENE, sold by GDC, Inc. A baffle according to the present disclosure may also be made of a thermoplastic elastomer, or a thermoplastic vulcanizate, or any other material suitable for injection molding.

In constructing the baffle 10/110/210/310, a material is selected and injected in a molten state into a mold. The material is then allowed to solidify, which forms the baffle. The mold includes cavities which allow for the creation of a base portion and an edge portion. As has been described, the base portion has a base portion thickness, and the edge portion has an edge portion thickness that is less than the base portion thickness. The design described herein advantageously allows for a single-shot workflow and avoids laborious, time-consuming, and expensive steps.

While the present invention has been described in terms of preferred embodiments, it will be understood, of course, that the invention is not limited thereto since modifications may be made to those skilled in the art, particularly in light of the foregoing teachings.

What is claimed is:

1. A baffle for regulating air flow around an object, the baffle comprising:
   a base portion, and
   an edge portion for contacting a surface of the object, the base portion and the edge portion being of unitary construction,
   the base portion having a base portion thickness, and the edge portion having an edge portion thickness that is less than the base portion thickness,
   wherein the baffle includes a first end and a second end, wherein the first end and the second end are separate from each other and the baffle has a length extending between the first and second ends that are separate from each other, and wherein the edge portion extends along at least a portion of the length of the baffle.

2. The baffle of claim 1, further comprising first and second major surfaces and a junction between the base portion and the edge portion, wherein the first and second major surfaces are substantially continuous at the junction.

3. The baffle of claim 1, further comprising first and second major surfaces and a junction between the base portion and the edge portion, wherein the base portion has a base portion thickness at the junction, and the edge portion has an edge portion thickness at the junction that is less than the base portion thickness, such that the first or second major surfaces define a step down at the junction.

4. The baffle of claim 3, wherein the edge portion has a substantially uniform edge portion thickness.

5. The baffle of claim 1, wherein the edge portion is tapered such that the edge portion thickness comprises a first edge portion thickness proximal to the base portion and a second edge portion thickness distal to the base portion that is less than the first edge portion thickness.

6. The baffle of claim 1, wherein the base portion has a substantially uniform base portion thickness.

7. The baffle of claim 1, wherein the edge portion preferentially deforms in a defined direction when the edge portion is placed in contact with the surface of the object.

8. The baffle of claim 7, wherein the edge portion comprises a curved portion, the curved portion defining a curve.

9. The baffle of claim 8, wherein the edge portion preferentially deforms in the direction of the curve.

10. The baffle of claim 1, wherein the edge portion thickness is about 20% to about 75% of the base portion thickness.

11. The baffle of claim 1, wherein the baffle is made by a single shot injection molding process.

12. The baffle of claim 1, wherein flexibility of the edge portion is different when the baffle is brought into engagement with the object in an angled direction that is non-parallel with a plane defined by the base portion, wherein the amount of deformation is controlled by the angled direction.

13. The baffle of claim 12, wherein the edge portion is curved, and wherein the flexibility of the edge portion is greater when a reaction force from the object is applied in a direction of the curve, and wherein the flexibility of the edge portion is smaller when the reaction force from the object is applied in a direction opposite the curve.

14. The baffle of claim 1, wherein an increased extension of the edge portion from the base portion corresponds to an increased flexibility of the edge portion.

15. A baffle for regulating air flow around an object, the baffle comprising a base portion and an edge portion for contacting a surface of the object, the base portion and the edge portion being of unitary construction of the same material having the same flexibility for a given shape, wherein the edge portion is more flexible than the base portion, wherein the edge portion extends lengthwise between opposing first and second ends thereof.

16. The baffle of claim 15, wherein the base portion has a shape defining a first flexural modulus, and the edge portion has a shape defining a second flexural modulus that is less than the first flexural modulus.

17. The baffle of claim 16, wherein the second flexural modulus is about 10% to about 95% of the first flexural modulus.

18. A baffle for regulating air flow around an object, the baffle comprising a base portion and an edge portion for contacting a surface of the object, the base portion and the edge portion being of monolithic construction, wherein the edge portion is thinner than the base portion such that the edge portion flexes relative to the base portion when brought into contact with the object, wherein the edge portion extends lengthwise along at least a portion of a length of the baffle, the length defined between opposing first and second ends of the baffle.

19. The baffle of claim 18, wherein the base portion is substantially planar.

20. The baffle of claim 18, wherein the first and second ends are separate.

* * * * *